United States Patent [19]

Lambert

[11] Patent Number: 4,576,407
[45] Date of Patent: Mar. 18, 1986

[54] ROBOT HAND FOR LIFTING APERTURED PANEL

[75] Inventor: George F. Lambert, Fenton, Mich.
[73] Assignee: General Motors Corporation, Detroit, Mich.
[21] Appl. No.: 694,022
[22] Filed: Jan. 23, 1985
[51] Int. Cl.[4] .......................... B25J 15/08; B66C 1/66
[52] U.S. Cl. ..................................... 294/97; 294/88; 901/39
[58] Field of Search .................. 294/86.24, 86.25, 88, 294/89, 93–95, 97, 115; 901/31, 37, 39

[56] References Cited

U.S. PATENT DOCUMENTS

| 604,973 | 5/1898 | Dinkey | 294/95 |
| 1,938,485 | 12/1933 | Cossor | 294/89 X |
| 2,895,430 | 7/1959 | Dunlap | 294/95 X |
| 3,233,908 | 2/1966 | Schwarzmayr et al. | 294/95 X |
| 3,251,623 | 5/1966 | Fredholm | 294/97 |

FOREIGN PATENT DOCUMENTS

| 40053 | 7/1965 | German Democratic Rep. | 294/95 |
| 240973 | 8/1969 | U.S.S.R. | 294/97 |
| 630193 | 11/1978 | U.S.S.R. | 294/95 |
| 798017 | 1/1981 | U.S.S.R. | 294/95 |

Primary Examiner—Johnny D. Cherry
Attorney, Agent, or Firm—Charles E. Leahy

[57] ABSTRACT

A robot hand for lifting an apertured panel includes a pair of tong fingers pivotally mounted upon a housing having a locating face. The tong fingers have opposed facing knuckles including a circular cylindrical wall portion adjacent the pivot and spherical cam faces adjacent the distal ends. An air cylinder operated toggle linkage moves the tong arms between a pinched together position contracting the tong finger knuckles for insertion through the aperture of the apertured panel and spread apart positions in which the circular cylindrical wall portions engage the aperture walls to locate the panel in the longitudinal and transverse directions and the spherical cam faces engage with the underside of the panel and lift the panel against the locating face of the housing.

1 Claim, 5 Drawing Figures

ROBOT HAND FOR LIFTING APERTURED PANEL

The invention relates to a robot hand and more particularly to a hand particularly suited for lifting an apertured panel such as a pressed wood fiber hardboard.

BACKGROUND OF THE INVENTION

It is well known to employ robots in the manufacture and assembly of automobile components. Robots may be employed to pick up a workpiece, perform various manufacturing and assembly operations thereon, and then place the workpiece at a desired location. Thus, the robot is equipped with a hand suitable for picking up, holding, manipulating, and then placing the workpiece.

It is known that the robot hand may incorporate a magnet for picking up a metallic workpiece. Furthermore, the robot hand may be a suction cup for picking up a workpiece which is air impermeable. Still other robot hands may have a pair of fingers which are squeezed together to grip opposing faces of the workpiece.

It would be desirable to provide a robot hand which could pick up a non-magnetic air-permeable workpiece of the type in which the outer margin of the workpiece must be clear of any gripping fingers thereon because of the need to perform manufacturing and assembly operations on the margin of the workpiece. For example, in the manufacture of trim panels for motor vehicle doors, it is desirable to pick up a pressed wood fiber hardboard panel via an aperture in the panel and to apply glue to the hardboard and then install a sheet of carpet or vinyl onto the hardboard and wrapped around the edges thereof.

SUMMARY OF THE INVENTION

According to the present invention, a robot hand for lifting an apertured panel includes a housing having a planar face which the robot moves to a suspended position above the apertured panel. A pair of tong fingers are pivotally mounted upon the housing and have opposed facing knuckles including a circular cylindrical wall portion adjacent the pivot and spherical cam faces adjacent the distal ends. An operating mechanism, such as a toggle linkage, connects the tong arms with an operator such as an air cylinder. The operating mechanism moves the tong arms between a pinched together contracted position in which the knuckles of the tong fingers are contracted sufficiently to enable the robot to insert the tong fingers through the aperture of the apertured panel. The operating mechanism may then be actuated to spread the tong fingers apart so that the circular cylindrical wall portions engage the aperture walls of the apertured panel to locate the panel in the longitudinal and transverse directions and the spherical cam faces engage with the underside of the apertured panel and lift the apertured panel vertically into captured engagement against the planar face of the housing. Thus, the apertured panel is captured by the tong arms and the housing to precisely and accurately locate the apertured panel on the robot arm so that the robot arm may manipulate the apertured panel as desired for subsequent handling, manufacturing and assembly operations.

Thus, the object, feature and advantage of the present invention resides in the provision of a robot hand having tong fingers adapted for insertion into an aperture of the apertured panel and for spreading apart to engage opposed outward facing cam faces with the aperture wall and the underside of the apertured panel, thereby vertically lifting the apertured panel into engagement with a planar locating face so that the apertured panel is precisely located on the robot hand.

DESCRIPTION OF THE DRAWINGS

These and other features, objects and advantages of the invention will become apparent upon consideration of the specification and appended drawings in which.

DESCRIPTION OF THE PREFERRED EMBODIMENT

Figure 1:
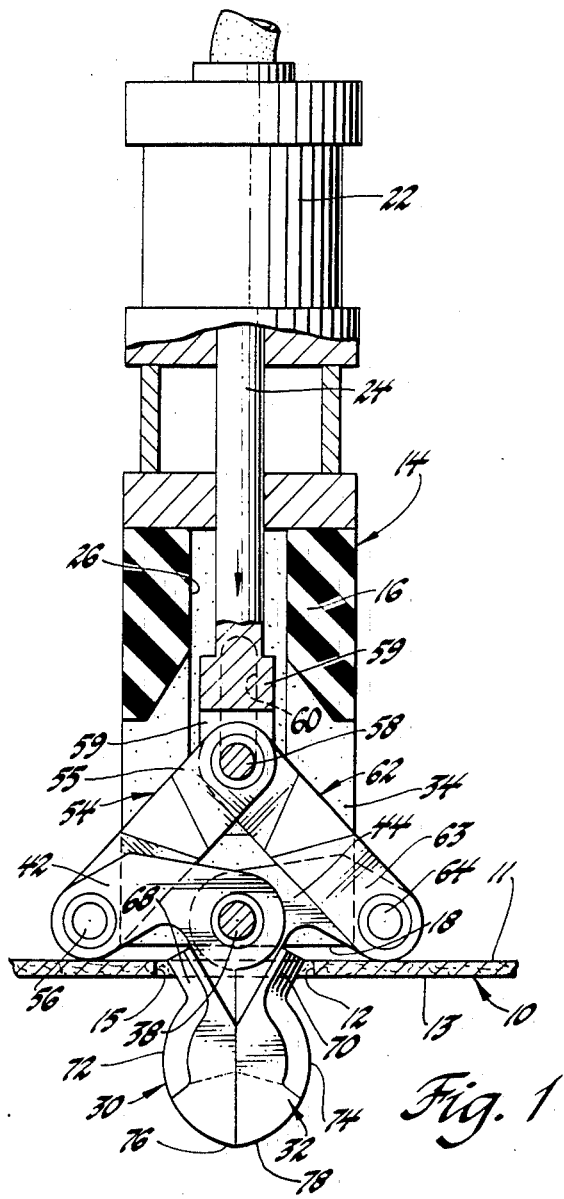
FIG. 1 is an elevation view of the robot hand having parts broken away and in section.

Referring to FIG. 1 there is shown a hardboard panel 10 which is made from compressed together woodfibers. The panel 10 has a topside 11, an underside 13, and an aperture 12, which is preferably a round hole and is defined by an aperture wall 15.

A robot hand 14 is provided for lifting the panel 10 via the aperture 12. More particularly, the robot hand 14 includes a housing 16 which is preferably fabricated from a block of hard rubber or the like. The housing 16 has a planar locating end face 18 at the lower end thereof. A conventional air or hydraulic cylinder 22 is suitably attached to the upper end of the housing 16 and has a rod 24 which extends into a central bore 26 of the housing 16.

Figure 5:
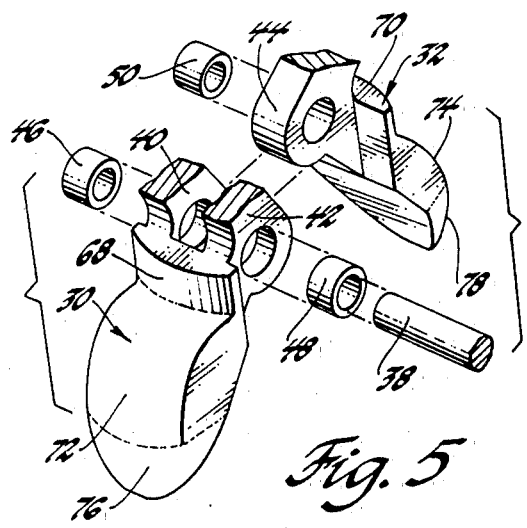
FIG. 5 is an exploded perspective view showing the tong fingers of the invention.

A pair of tong fingers 30 and 32 are pivotally mounted between spaced apart legs 34 and 36 of the housing 16 by a pivot pin 38. As seen in FIG. 5, tong finger 30 has spaced apart pivot portions 40 and 42 having a space therebetween which receives a mating pivot portion 44 of the tong finger 32 therebetween. The tong portions 40, 42 and 44 have aligned apertures therethrough receiving bearings 46, 48 and 50 which, in turn, receive the pivot pin 38.

Figure 2:
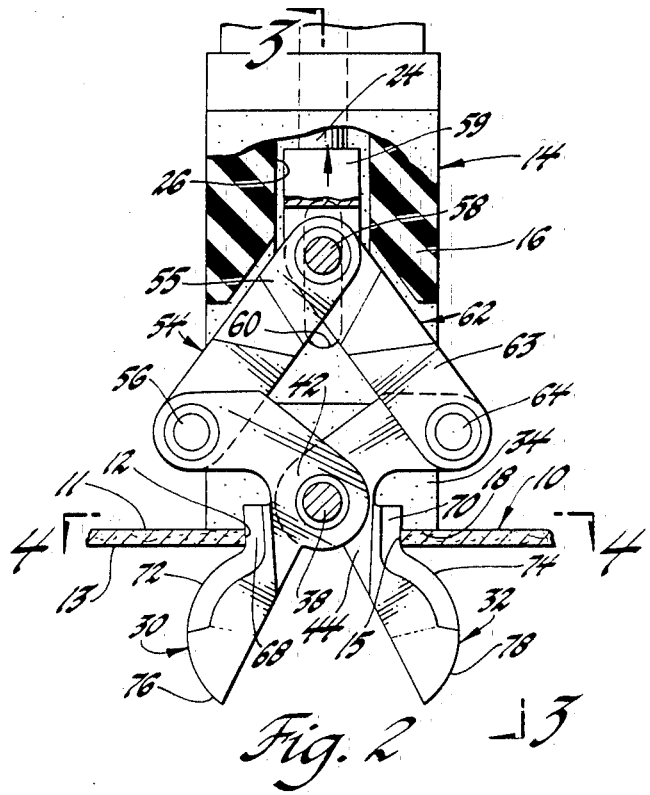
FIG. 2 is a view similar to FIG. 1 but showing the tong fingers of the robot hand expanded to pick up the apertured panel.

As best seen in FIGS. 1 and 2, the upper end of the pivot portions 40 and 42 of the tong finger 30 are pivotally connected to a toggle link 54 by a pivot pin 56. The toggle link 54 has spaced apart pivot portions 55 and 57 which are attached to a clevis end portion 59 of the rod 24 by a pin 58 which is guided in slots 60 and 61 in the housing 16. As best seen in FIG. 2, a similar toggle link 62 has spaced apart pivot ends, one of which is designated 63, which straddles the upper end of pivot portion 44 of the tong finger 32 and is connected thereto by a pivot pin 64. The upper end of the toggle link 62 is pivotally mounted on the clevis end portion 59 between pivot portions 55 and 57 of the toggle link 54 by the pin 58. Accordingly, as best seen by comparing FIGS. 1 and 2, a downward movement of the rod 24 acts through the toggle links 54 and 62 to pivot the tong fingers 30 and 32 to their pinched together contracted positions of FIG. 1. Upward movement of the rod 24 raises the toggle links 54 and 62 to in turn pivot the tong fingers 30 and 32 about the pivot pin 38 to the spread apart expanded position of FIG. 2.

Figure 4:
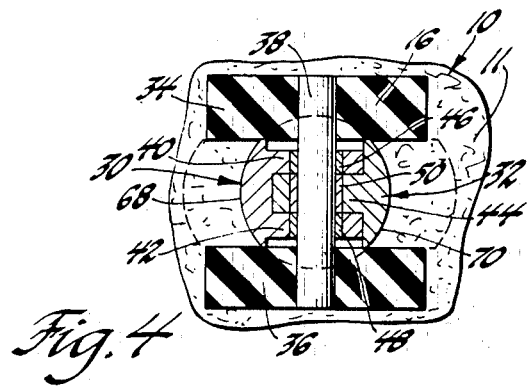
FIG. 4 is a sectional view taken in the direction of arrows 4—4 of FIG. 2.
Figure 3:
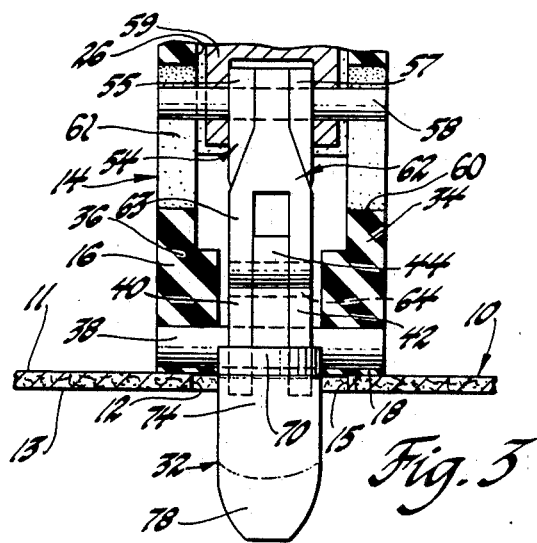
FIG. 3 is a sectional view taken in the direction of arrows 3—3 of FIG. 2.

The tong fingers 30 and 32 are particularly shaped to pick up and precisely locate the apertured panel 10. The shape of the tong fingers 30 and 32 includes opposed facing knuckles having upper circular cylindrical wall portions 68 and 70 which, when the tong fingers 30 and 32 are spread apart to their position shown in FIGS. 2 and 4, cooperate to define opposed facing right circular cylindrical walls having a diameter equal to the diameter of the aperture 12 in the panel 10. The lower portions of the tong finger knuckles have a spherical shape of greater diameter than the upper cylindrical wall portions 68 and 70 to define upper hemispheres having opposed facing spherical cam faces 72 and 74, and lower hemispheres having opposed facing spherical cam faces 76 and 78.

As best seen in FIG. 1, the outer diameter of the spherical shape of the tong finger knuckles is less than the diameter of the aperture 12 when the tong fingers 30 and 32 are in their pinched together contracted position.

As best seen in FIG. 1, the pinched together contracted positions of the tong fingers 30 and 32 permit the robot to move the hand 14 to the position of FIG. 1 in which the tong fingers 30 and 32 have been inserted through the aperture 12 of the panel 10 and the end face 18 of the housing 16 is poised above the panel 10. During such insertion of the tong fingers 30 and 32 into the aperture, the lower hemisphere cam faces 76 and 78 of the tong fingers will engage against the corner of the aperture wall 15 and the topside 11 of the panel 10 to shift the panel to a more centered position with respect to the descending robot hand 14.

In order to pick up and precisely locate the panel 10, the air cylinder 22 is actuated to withdraw the rod 24 upwardly. As best seen in FIG. 2, upward lifting movement of the rod 24 acts through the toggle links 54 and 62 to pivot the tong fingers 30 and 32 to the spread apart expanded position as shown in FIG. 2. As the tong fingers 30 and 32 approach this fully expanded position, the opposed facing spherical cam faces 72 and 74 of the upper hemisphere bear against the corners of the intersection of the aperture wall 15 and the underside 13 of the panel 10 to lift the panel 10 vertically upwardly into engagement with the end face 18 of the housing 16. Simultaneously the expanding movement of the tong fingers 30 and 32 causes the cylindrical wall portions 68 and 70 thereof to engage with the aperture wall 15 to precisely locate the panel 10 in the horizontal plane. The diameter of the cylindrical upper wall portions 68 and 70 is the same as the diameter of the aperture 12 so that the panel will be precisely located in the horizontal plane.

Having obtained the expanded position of the tong fingers 30 and 32, the robot may manipulate the hand 14 as desired to move the panel 10 through various manufacturing and assembly operations. For example, the panel 10 may have fasteners installed thereon and a vinyl trim covering sheet may be adhesively or otherwise secured to the panel. It will be appreciated that the adhesive securement of such a vinyl sheet covering is facilitated by the fact that the robot hand 14 of this invention reaches into and picks up the panel 10 via an aperture in the panel instead of gripping an edge margin of the panel which could otherwise interfere with assembly operations to be performed on such an edge of the panel.

After the assembly operations have been performed, the panel 10 may be precisely placed in a stack of finished parts, or installed on a vehicle body. In order to remove the robot hand from the panel 10, the air cylinder 22 is actuated to extend the rod 24 downwardly from the position of FIG. 2 to the position of FIG. 1. As best seen in FIG. 1, the resulting downward movement of the pivot portions 40, 42 and 44 of the tong arms moves their undersides downwardly further than the locating end face 18 of the housing 16 and will accordingly engage against the panel 10 to assure that the panel 10 becomes dislodged from the locating end face 18 and the panel 10 is ejected from the robot hand.

It will be understood that although the housing 16 is described and shown herein as being constructed of a hard rubber, it may be desirable to construct the housing of any suitable metal or plastic material.

The robot hand of this invention is particularly suited for picking up a porous and non-magnetic material, such as wood, which cannot be picked up by a suction cup or a magnet. However, the arm can also be used to pick up a non-porous and magnetic workpiece, such as a steel plate with an aperture therein.

Thus it is seen that the invention provides a new and improved robotic hand for picking up an apertured panel.

The embodiments of the invention in which an exclusive property or privilege is claimed are defined as follows:

1. A hand for a robot adapted particularly to pick up and hold a panel having a topside, an underside, and an aperture therethrough defined by an aperture wall, comprising:

a housing mounted on an arm of the robot and having a locating surface;

first and second tong fingers having upper ends, pivot portions pivotally mounted on the housing and lower ends depending beyond the locating surface of the housing;

each of said tong fingers having a generally spherical knuckle facing in the opposite direction from the knuckle of the other tong finger and cooperating therewith to define opposing upper hemispherical cam faces and opposing lower hemispherical cam faces;

operating means associated with the upper ends of the first and second tong fingers and adapted to pivotally move the tong fingers between pinched together contracted positions in which the upper ends of the tong fingers also depend below the locating surface of the housing and the knuckles are smaller than the aperture to permit insertion of the tong fingers through the panel aperture, and spread apart positions in which the upper ends of the tong fingers are raised above the locating surface of the housing and the panel is captured between the upper hemispherical cam faces of the tong finger knuckles and the housing locating surface;

said lower hemispherical cam faces cooperating upon insertion of the tong fingers to engage the aperture wall in the event that the panel is misaligned with respect to the tong fingers to shift the panel to facilitate insertion, and said upper heimspherical cam faces cooperating upon movement of the tong fingers to the spread apart position to engage against the underside of the panel and lift the panel into engagement with the locating surface of the housing; and subsequent return movement of the tong fingers to the pinched together contracted position again moving the tong finger upper ends to the position depending below the locating surface of the housing to engage with the topside of the panel and thereby assure that the panel is dislodge from the locating surface and ejected from the robot hand.

* * * * *